United States Patent
Moore

(10) Patent No.: US 10,821,808 B2
(45) Date of Patent: Nov. 3, 2020

(54) UNIVERSAL MODE PLATE

(71) Applicant: DENSO International America, Inc., Southfield, MI (US)

(72) Inventor: Preston Moore, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 235 days.

(21) Appl. No.: 16/171,660

(22) Filed: Oct. 26, 2018

(65) Prior Publication Data

US 2020/0130463 A1 Apr. 30, 2020

(51) Int. Cl.
  *B60H 1/00* (2006.01)
(52) U.S. Cl.
  CPC ..... *B60H 1/00842* (2013.01); *B60H 1/00564* (2013.01); *B60H 1/00664* (2013.01); *B60H 1/00671* (2013.01); *B60H 1/00857* (2013.01); *B60H 1/0055* (2013.01); *B60H 1/00535* (2013.01); *B60H 1/00678* (2013.01); *B60H 1/00685* (2013.01); *B60H 1/00821* (2013.01); *B60H 1/00835* (2013.01); *B60H 1/00864* (2013.01); *B60H 2001/00707* (2013.01); *B60H 2001/00721* (2013.01)

(58) Field of Classification Search
  CPC ............ B60H 1/00842; B60H 1/00821; B60H 1/00835; B60H 1/00857; B60H 1/00864; B60H 1/00564; B60H 1/00535; B60H 1/0055; B60H 1/00664; B60H 1/00671; B60H 1/00685; B60H 1/00678; B60H 2001/00721; B60H 2001/00707
  USPC ........................................ 165/202, 203, 204
  See application file for complete search history.

(56) References Cited

U.S. PATENT DOCUMENTS

| | | | |
|---|---|---|---|
| 6,431,266 B1 | 8/2002 | Han | |
| 6,702,008 B1 * | 3/2004 | Hibino | B60H 1/00842 165/202 |
| 8,661,844 B2 | 3/2014 | Klinkhammer et al. | |
| 9,067,474 B2 * | 6/2015 | Mazzocco | F16H 19/08 |
| 9,290,076 B2 * | 3/2016 | Mayer | B60H 1/00671 |
| 10,081,225 B2 * | 9/2018 | Kang | B60H 1/00064 |
| 2019/0232756 A1 * | 8/2019 | Matsuda | E05F 15/616 |

* cited by examiner

*Primary Examiner* — Joel M Attey
(74) *Attorney, Agent, or Firm* — Harness, Dickey & Pierce, P.L.C.

(57) ABSTRACT

A heating, ventilation, and air conditioning (HVAC) system including an HVAC assembly, a set of pins, mode doors, a mode plate, an actuator, and an HVAC control module. The mode doors control airflow from the HVAC assembly. A position of each mode door is controlled by a corresponding pin of the set of pins. The mode plate includes (i) a set of grooves, (ii) a first adjustment path and (iii) a second adjustment path. The first adjustment path causes a first pin of the set of pins to move toward a center. The second adjustment path causes the first pin to move away from the center of the mode plate. An HVAC module selectively actuates the actuator to causes the mode plate to rotate in at least one of a passive direction and the active direction in response to receiving a mode request.

20 Claims, 9 Drawing Sheets

UNIVERSAL MODE PLATE

FIELD

The present disclosure relates to a universal mode plate for an automotive heating, ventilating, and air conditioning system.

BACKGROUND

This section provides background information related to the present disclosure and is not necessarily prior art.

Vehicles, such as automobiles, include climate control systems or heating, ventilation and air conditioning (HVAC) systems that function to heat, ventilate and cool a passenger compartment of a vehicle. HVAC systems include an HVAC assembly. The HVAC assembly includes an evaporator, a heater core, a fresh air inlet, a recirculated air inlet, air duct outlets, and a blower scroll. The blower scroll is driven by an electric motor for drawing air from one or both of the inlets.

The air may be subsequently heated, with the heater core, or cooled, with the evaporator, and discharged into the passenger compartment through the air duct outlets. The air duct outlets may include a defrost outlet, a front outlet, a foot outlet, and a rear outlet. Airflow from the air duct outlets is controlled by selectively positioning mode doors that are connected to the HVAC assembly. A mode plate controls the mode doors. An actuator is connected to the mode plate in order to rotate the mode plate. A pin associated with each mode door is inserted into a groove of the mode plate and varies a position of each of the mode doors when the mode plate is rotated.

SUMMARY

This section provides a general summary of the disclosure, and is not a comprehensive disclosure of its full scope or all of its features.

In a feature, a heating, ventilation, and air conditioning (HVAC) system is described. The HVAC system includes an HVAC assembly, a first set of pins, a first set of mode doors, a first mode plate, an actuator, and an HVAC control module. The HVAC assembly includes a blower subassembly, a heater core, and an evaporator. A first set of mode doors controls airflow from the HVAC assembly where a position of each mode door of the first set of mode doors is controlled by a corresponding pin of the first set of pins. The first mode plate includes (i) a set of grooves, (ii) a first adjustment path, and (iii) a second adjustment path. The first adjustment path includes (i) a first inner wall, (ii) a first set of slopes, and (iii) a second set of slopes. The second adjustment path includes (i) a second inner wall, (ii) a third set of slopes, and (iii) a fourth set of slopes. The first adjustment path and the second adjustment path span from an outermost groove of the set of grooves to an innermost groove of the set of grooves. The first adjustment path causes a first pin of the first set of pins to move toward a center of the first mode plate in response to being (i) rotated in an active direction and (ii) selectively positioned. The second adjustment path causes the first pin to move away from the center of the first mode plate in response to being (i) rotated in the active direction and (ii) selectively positioned. The actuator that causes the first mode plate to rotate in at least one of a passive direction and the active direction. The HVAC control module that selectively actuates the actuator in response to receiving a mode request.

In further features, the first set of mode doors are connected to the HVAC assembly through a set of hinge portions and rotatable through the set of hinge portions. The actuator is connected to the first mode plate.

In further features, the first adjustment path causes the first pin to move independently of other pins. The second adjustment path causes the first pin to move independently of the other pins.

In further features, each of the second set of slopes includes a first end and a second end. Each of the third set of slopes includes a third end and a fourth end. The first end (i) is positioned closer to the center of the first mode plate than the second end, (ii) has a higher elevation than the second end, and (iii) is opposite the second end. The third end (i) is positioned further from the center of the first mode plate than the fourth end, (ii) has a higher elevation than the fourth end, and (iii) is opposite the fourth end.

In further features, the first adjustment path and the second adjustment path are integrally formed with the first mode plate.

In further features, the passive direction and the active direction are opposite directions. The first adjustment path and the second adjustment path do not move the first pin toward the center of the first mode plate or away from the center of the first mode plate in response to being rotated in the passive direction.

In further features, the set of grooves are U-shaped.

In further features, a height of the first end is less than a height of the first inner wall and a height of the third end is less than a height of the second inner wall.

In further features, the mode request is a request to change a temperature setting of at least one zone of a vehicle.

In further features, the first pin is moved along at least one of the first adjustment path and the second adjustment path until the first pin reaches a target position.

In further features, the HVAC control module instructs the actuator to at least one of a change of direction of rotation of the first mode plate and stop rotating in response to the first pin reaching a target position.

In further features, the HVAC system includes a second set of mode doors, a second set of pins, and a second mode plate. The second mode plate includes (i) a second set of grooves, (ii) a third adjustment path, and (iii) a fourth adjustment path. The third adjustment path includes (i) a third inner wall, (ii) a fifth set of slopes, and (iii) a sixth set of slopes. The fourth adjustment path includes (i) a fourth inner wall, (ii) a seventh set of slopes, and (iii) an eighth set of slopes. The third adjustment path and the fourth adjustment path span from an outermost groove of the second set of grooves to an innermost groove of the second set of grooves. The third adjustment path causes a second pin of the second set of pins to move toward a center of the second mode plate in response to being (i) rotated in the active direction and (ii) selectively positioned. The fourth adjustment path causes the second pin to move away from the center of the second mode plate in response to being (i) rotated in the active direction and (ii) selectively positioned. A center plate that is positioned between the first mode plate and the second mode plate. A center shaft that is connected to the center plate. The center shaft includes a control gate, a control pin, and a ninth set of slopes. The actuator is further configured to cause the second mode plate to rotate in at least one of the passive direction and the active direction. The actuator is connected to the control pin. A position of each mode door of the second set of mode doors is controlled by a corresponding pin of the second set of pins.

In further features, each slope of the fifth set of slopes includes a ninth end and tenth end. The ninth end has a higher elevation than the tenth end and is opposite the tenth end.

In a feature, a mode plate for a heating, ventilation and air conditioning (HVAC) system is described. The HVAC system includes an HVAC control module, a blower subassembly, a heater core, an evaporator, an actuator, a set of pins, and a set of mode doors that controls airflow from the HVAC system. The mode plate includes a set of grooves, a first adjustment path, and a second adjustment path. The first adjustment path selectively causes a pin in the set of pins to move toward a center of the mode plate. The second adjustment path selectively causes the pin to move away from the center of the mode plate. The first adjustment path includes (i) a first inner wall, (ii) a first set of slopes, and (iii) a second set of slopes. The second adjustment path includes (i) a second inner wall, (ii) a third set of slopes, and (iii) a fourth set of slopes. The first adjustment path and the second adjustment path span from an outermost groove of the set of grooves to an innermost groove of the set of grooves. The first adjustment path causes the pin to move toward a center of the mode plate in response to being (i) rotated in an active direction and (ii) selectively positioned. The second adjustment path causes the pin to move away from the center of the mode plate in response to being (i) rotated in the active direction and (ii) selectively positioned. The actuator causes the mode plate to rotate in at least one of a passive direction and the active direction. The HVAC control module selectively actuates the actuator in response to receiving a mode request. A position of each mode door of the set of mode doors is controlled by a corresponding pin of the set of pins.

In a feature, a method for controlling mode doors of an HVAC system is described. The HVAC system includes an HVAC control module, a blower subassembly, a heater core, an evaporator, an actuator, a set of pins, a mode plate including a set of grooves, and a set of mode doors that controls airflow from the HVAC system. The method includes in response to receiving a mode request: (i) determining a position of at least one pin in the set of pins and (ii) determining whether the at least one pin is set to a target position specified by the mode request. The method further includes in response to determining that the at least one pin is not set to the target position: (i) rotating the mode plate in a passive direction until at least one of a first adjustment path and a second adjustment path is in position to adjust the at least one pin and (ii) in response to at least one of the first adjustment path and the second adjustment path being in position to adjust the at least one pin, rotating the mode plate in a second direction until the at least one pin reaches the target position. A position of each mode door of the set of mode doors being controlled by a corresponding pin of the set of pins. The first adjustment path includes (i) a first inner wall, (ii) a first set of slopes, and (iii) a second set of slopes. The second adjustment path includes (i) a second inner wall, (ii) a third set of slopes, and (iii) a fourth set of slops. The first adjustment path and the second adjustment span from an outermost groove of the set of grooves to an innermost groove of the set of grooves.

In further features, the first adjustment path causes the at least one pin to move independently of other pins in the set of pins. The second adjustment path causes the pin to move independently of the other pins.

In further features, the passive direction and the active direction are opposite directions.

In further features, rotating the mode plate in the active direction moves the at least one pin towards at least one of a center of the mode plate or away from the center of the mode plate.

In further features, rotating the mode plate in the passive direction does not change the position of the at least one pin with respect to a center of the mode plate.

In further features, the mode request is a request to change a temperature setting of at least one zone of a vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

AN HVAC assembly includes mode doors that selectively control airflow through air duct outlets. The air duct outlets control airflow to various regions of a passenger compartment of a vehicle and/or windshield. By varying the degree of opening of the mode doors, airflow may be restricted. In the prior art, the mode doors may be controlled by a mode plate that is controlled by a single actuator. Pins functionally connected to the mode doors through hinges and a series of levers are inserted into fixed grooves of the mode plate. The mode plate is rotated in order to vary the openings of the mode doors. The possible combination of openings for the mode doors is thus limited to a finite set of combinations based on the position of the pins within the fixed grooves of the mode plate.

Figure 1:
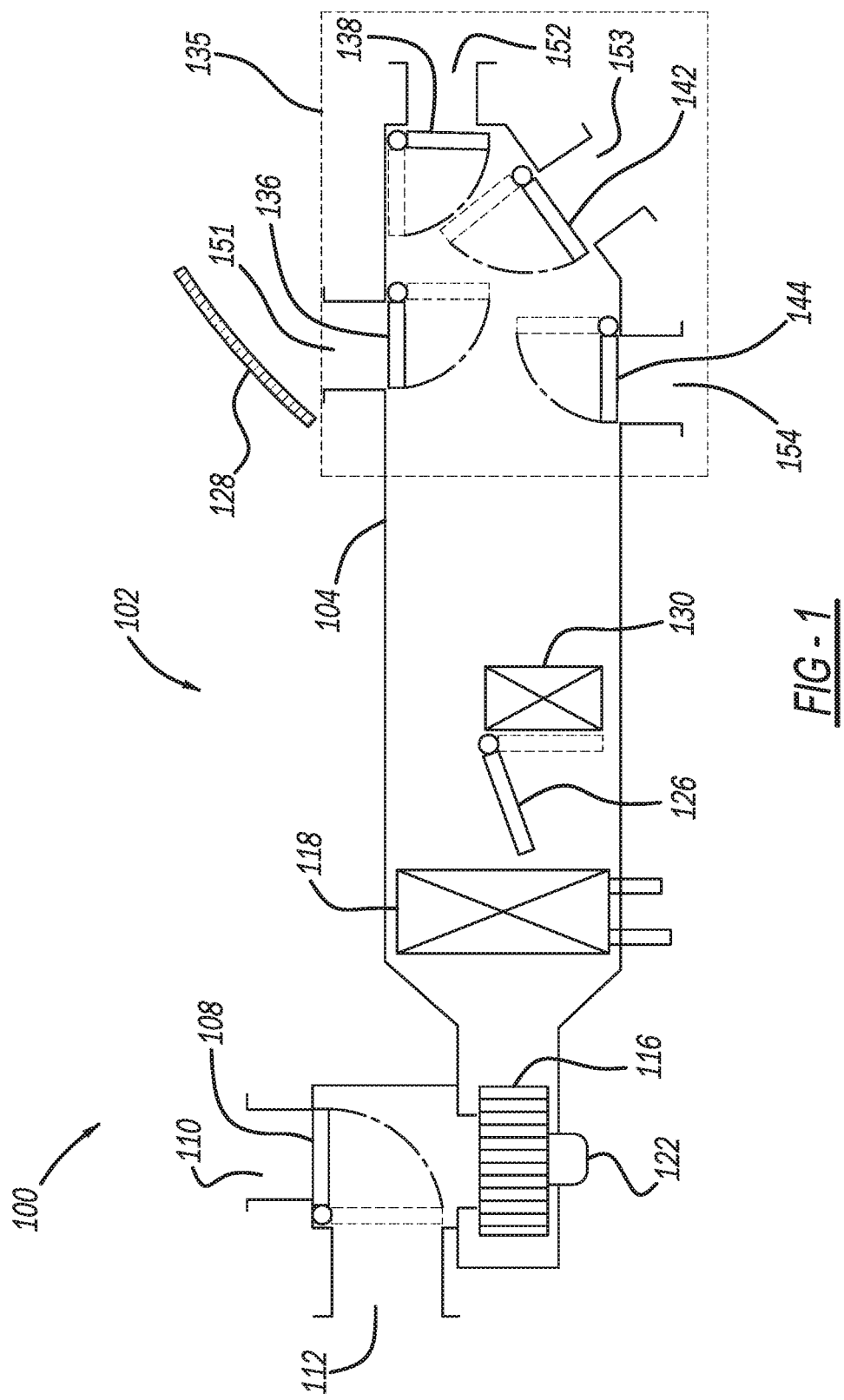
FIG. 1 is a schematic diagram of an HVAC system according to the present teachings.

Referring to FIG. 1, an HVAC system 100 is shown. The air conditioning system 100 includes an HVAC assembly 102 which is located within a dashboard panel. The HVAC assembly 102 includes an air conditioning case 104, a blower fan 116, an evaporator 118, a heater core 130, mode doors 135, an outside air introduction port 110, an inside air introduction port 112, and air duct outlets. An inside/outside switching door 108 is switched to a first position to introduce air from inside the vehicle into the air conditioning case 104 through the inside air introduction port 112. The inside/outside switching door 108 is switched to a second position to introduce air outside the vehicle into the air conditioning case 104 through the outside air introduction port 110.

A blower fan 116 blows the outside air from the outside air introduction port 110 or the inside air from the inside air introduction port 112 as an air stream to the evaporator 118 in accordance with the rotational speed of a driving motor 122 of the blower fan 116. The evaporator 118 cools the air stream blown out from the blower fan 116 with refrigerant, which is circulated by actuation of a well-known refrigeration cycle.

An air mix door 126 distributes the cooled air stream from the evaporator 118 into a first cooled air stream and a second cooled air stream. The first cooled air stream flows into the heater core 130 and the second cooled air stream bypasses the heater core 130. The first cooled air stream is heated in the heater core 130 by cooling water (hot water) from a vehicle's engine, and thus hot air is blown out from the heater core 130. The hot air from the heater core 130 and the second cooled air stream, which bypassed the heater core 130, are mixed and flow to mode doors 135.

The mode doors 135 control the openings of the air duct outlets. The mode doors include a first mode door 136, a second mode door 138, a third mode door 142, and a fourth mode door 144. The air duct outlets may include a first outlet 151 for directing air at a windshield 128 of the vehicle, a second outlet 152 for directing toward the front of a passenger compartment of the vehicle, a third outlet for directing air towards the floor of the passenger compartment 153, and a fourth outlet 154 for directing air towards a rear of a passenger compartment.

The mixture ratio of the hot air and cooled air is determined by an opening degree of the air mix door 126. Each of the mode doors 135 may include a sensor that provides position signals related to the position of the respective mode door. Each one of the air duct outlets 151, 152, 153, and 154 may include an airflow sensor suitable for measuring airflow amount (i.e., volume for example) exiting each one of the air duct outlets 151, 152, 153, and 154.

Figure 2:
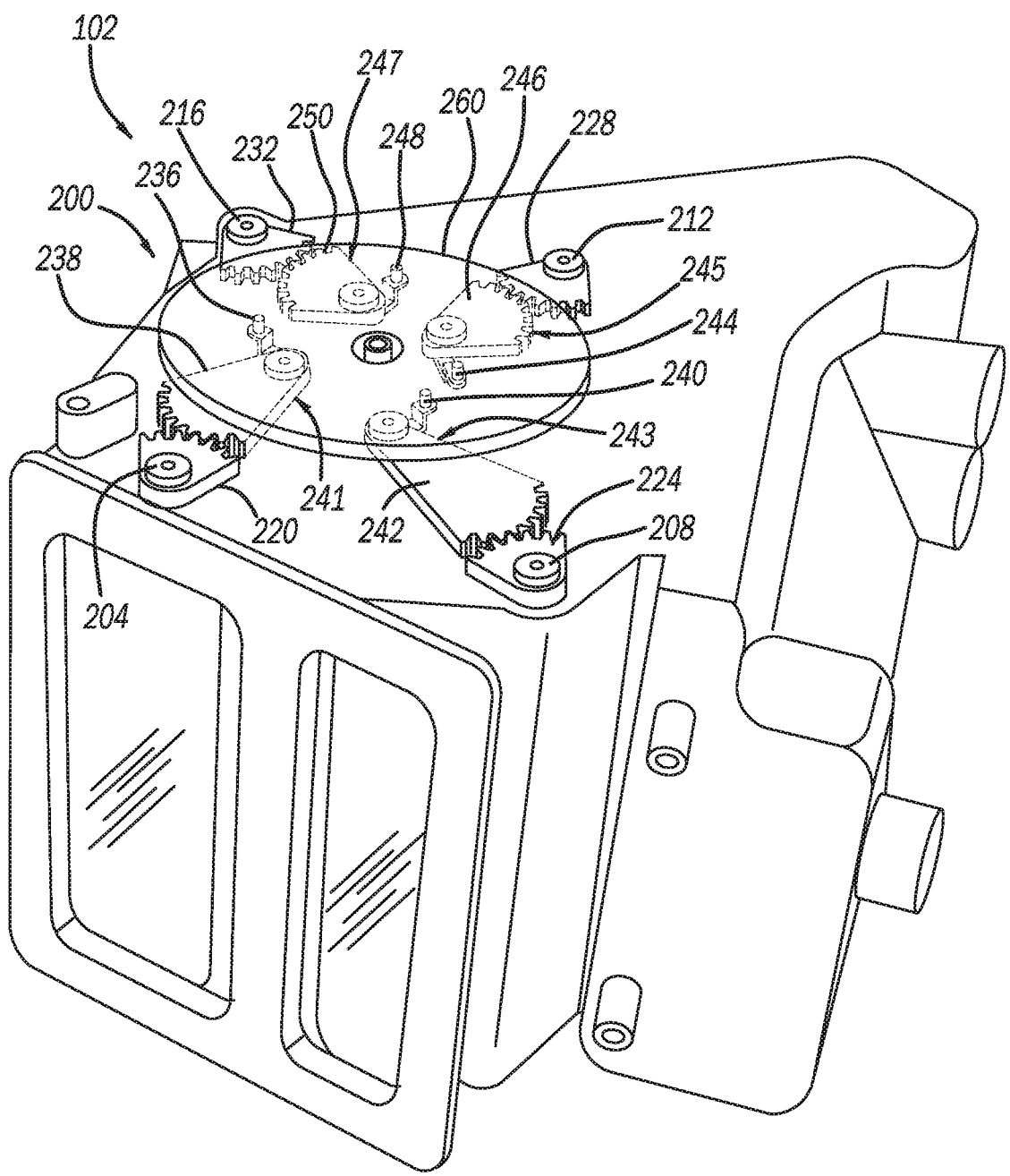
FIG. 2 is a perspective view of an HVAC assembly according to the present teachings.

With additional reference to FIG. 2, a perspective view of an HVAC assembly with a mode door mechanism 200 including a first mode plate 260 is shown. The first mode door 136, the second mode door 138, the third mode door 142, and the fourth mode door 144 are connected to the HVAC assembly 102 by a first hinge 204, a second hinge 208, a third hinge 212, and a fourth hinge 216, respectively. A first lever 220, a second lever 224, a third lever 228, and a fourth lever 232 are fixed between the first hinge 204, the second hinge 208, the third hinge 212, and the fourth hinge 216 of the HVAC assembly 102.

A first pin assembly 241, a second pin assembly 243, a third pin assembly 245, and a fourth pin assembly 247 are connected to the HVAC assembly 102. The first pin assembly 241 includes a first pin 236 and a first pin lever 238. The second pin assembly 243 includes a second pin 240 and a second pin lever 242. The third pin assembly 245 includes a third pin 244 and a third pin lever 246. The fourth pin assembly 247 includes a fourth pin 248 and a fourth pin lever 250. The first pin lever 238, the second pin lever 242, the third pin lever 246, and the fourth pin lever 250 are meshed with the first lever 220, the second lever 224, the third lever 228, and the fourth lever 232, respectively. The first pin 236, the second pin 240, the third pin 244, and the fourth pin 248 may be referred to collectively as the first set of pins. Each pin in the first set of pins may include a sensor, such as a displacement sensor, to measure the position of the pin relative to a reference point. The first mode plate 260 may also include a rotation sensor, such as a gyroscope sensor, to measure angular displacement of the first mode plate 260 relative to a set point.

Figure 3:
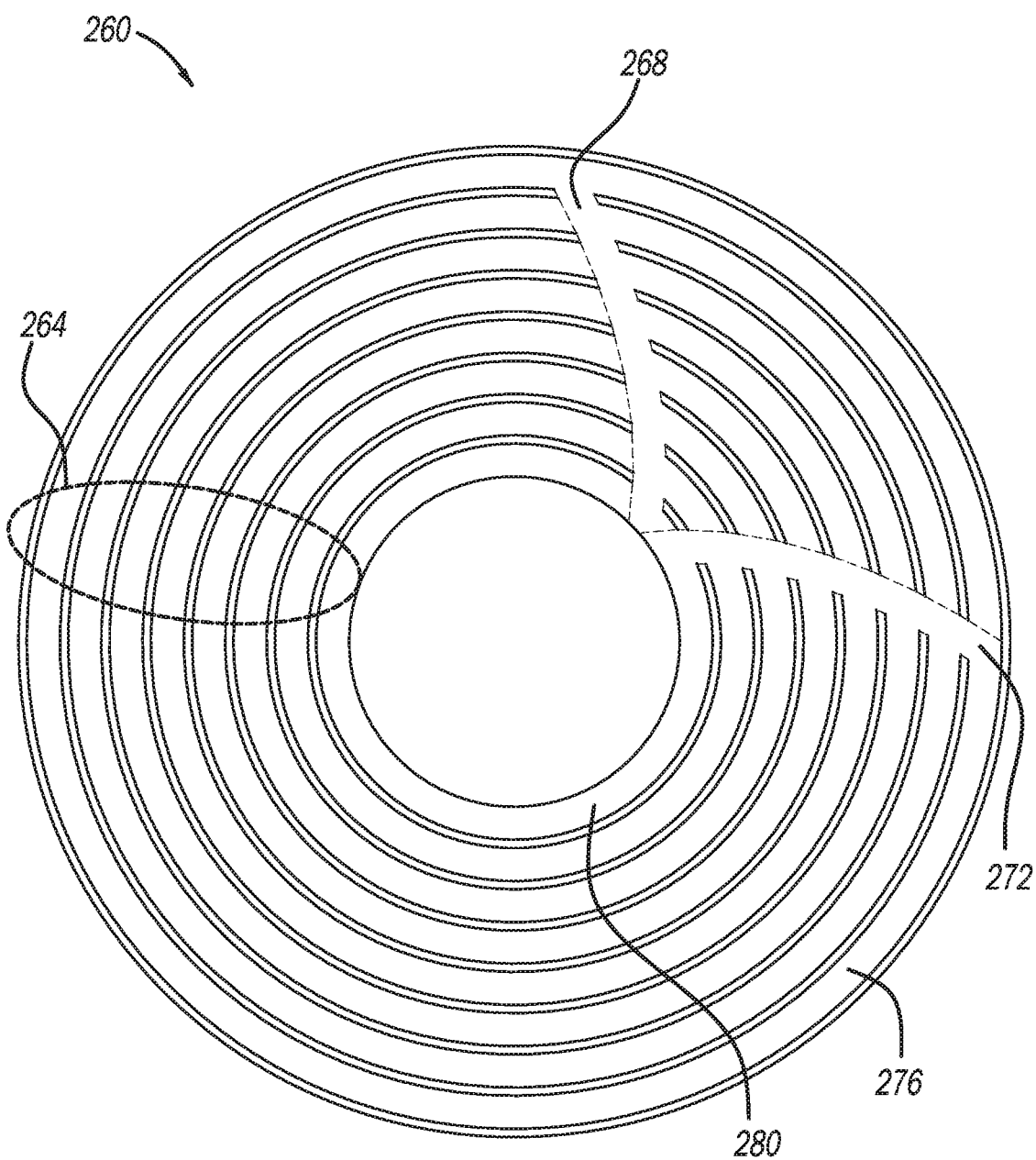
FIG. 3 is a view of a mode plate according to the present teachings.

With reference to FIG. 3, an example first mode plate 260 is shown. The first mode plate 260 has a set of grooves 264. The first set of pins is inserted into the set of grooves. The mode door mechanism may be configured such that moving the first set of pins toward a center of the plate opens the mode doors 135 and moving the first set of pins away from the center of the first mode plate 260 closes the mode doors 135. Alternatively, the mode door mechanism 200 may be configured such that moving the first set of pins toward the center of the first mode plate 260 closes the mode doors 135 and moving the first set of pins away from the center of the first mode plate 260 opens the mode doors 135.

An actuator rotates the first mode plate 260 in response to receiving a mode request. The first mode plate 260 is connected to the actuator by a shaft (not shown). The actuator may be any suitable actuator such as a rotary actuator, vacuum actuator, stepper motor, servo motor, or any other suitable type of actuator. The actuator rotates the first mode plate 260 in a passive direction or an active direction. For example, the passive direction may correspond to a clockwise direction and the active direction may correspond to a counterclockwise direction.

The set of grooves 264 may be integrally formed with the first mode plate 260. The set of grooves 264 are U-shaped but may be another suitable shape. The first mode plate 260 includes a first adjustment path 268 and a second adjustment path 272. The first adjustment path 268 and the second adjustment path 272 are geometrically designed to move the first set of pins toward the center of the first mode plate 260 or away from the center of the first mode plate 260 when selectively positioned and rotated. The first adjustment path 268 spans from an outermost groove 276 of the set of grooves to an innermost groove 280 of the set of grooves. The second adjustment path 272 also spans from the outermost groove 276 to the innermost groove 280.

Figure 4:
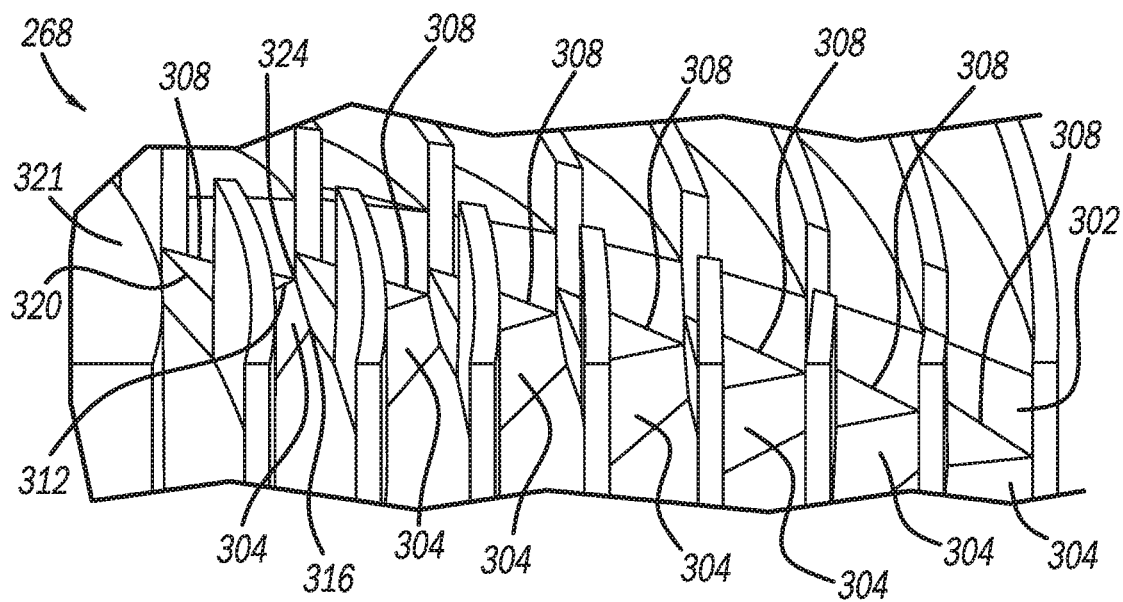
FIG. 4 is a perspective view of a first adjustment path of a mode plate according to the present teachings.

With reference to FIG. 4, the first adjustment path 268 is defined by a first inner wall 302, a first set of slopes 304, and a second set of slopes 308. The first adjustment path 268 is geometrically designed to move each pin of the first set of pins from an outer groove to an inner groove when rotated in the counterclockwise direction. The first set of slopes 304 engage each pin of the first set of pins along the first adjustment path 268. Each of the first set of slopes 304 includes a first end 312 and a second end 316. The second end 316 is opposite the first end 312. The first end 312 has a higher elevation profile than the second end 316. The first end 312 of each of the first set of slopes 304 is connected to a side of each of the second set of slopes 308.

Each of the second set of slopes 308 includes a third end 320 and a fourth end 324. The fourth end 324 is opposite the third end 320. The third end 320 is positioned closer to a center 321 of the first mode plate 260 than the fourth end 324 and has a higher elevation than the fourth end 324. After the first pin 236 has been engaged along the first adjustment path 268 and while the first mode plate 260 is rotating in the active direction, the second set of slopes 308 causes the first pin 236 to move into an inner groove.

Figure 5:
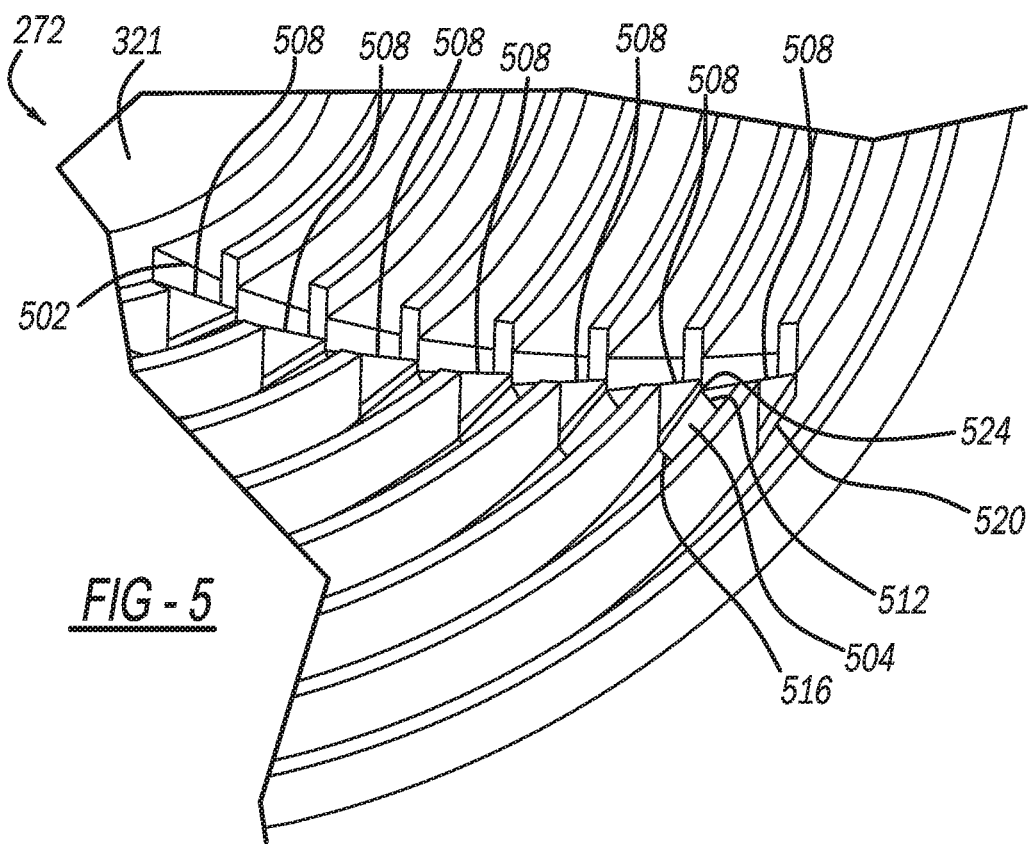
FIG. 5 is a perspective view of a second adjustment path of a mode plate according to the present teachings.

With reference to FIG. 5, the second adjustment path 272 is shown. The second adjustment path 272 is defined by a second inner wall 502, a third set of slopes 504, and a fourth set of slopes 508. The second adjustment path 272 is similar in design to the first adjustment path 268; however, the second adjustment path 272 is geometrically designed to move each pin of the first set of pins from an inner groove to an outer groove when rotated in the active direction. The third set of slopes 504 engage the first set of pins along the second adjustment path 272.

Each of the third set of slopes 504 includes a fifth end 512 and a sixth end 516. The sixth end 516 is opposite the fifth end 512. The fifth end 512 has a higher elevation than the sixth end 516. The fifth end of each of the third set of slopes 504 is connected to a side of each of the fourth set of slopes 508. Each of the fourth set of slopes 508 includes a seventh end 520 and an eighth end 524. The eighth end 524 is opposite the seventh end 520. The seventh end 520 is positioned further from the center 321 of the first mode plate 260 than the eighth end 524 and has a higher elevation than the eighth end 524. After the first pin 236 is engaged along the second adjustment path 272 and while the first mode plate 260 is rotating in the active direction, the fourth set of slopes 508 forces the first pin 236 into an outer groove.

Figure 6:
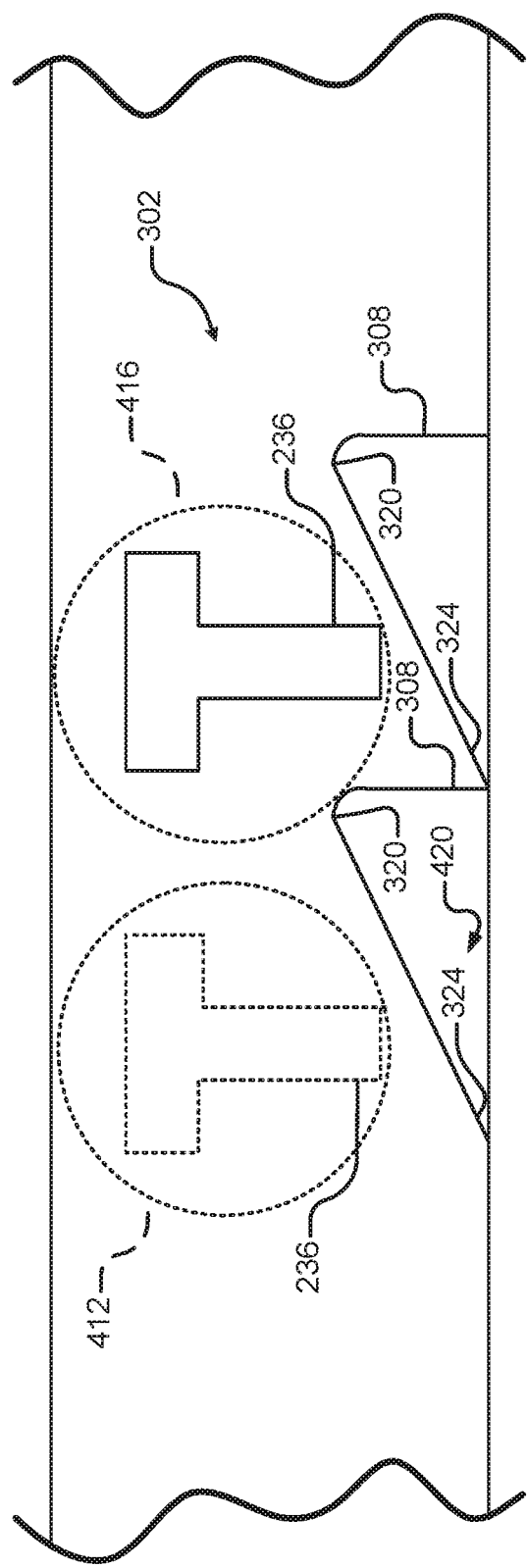
FIG. 6 is a view of an interaction between a pin and a slope of a mode plate according to the present teachings.

With reference to FIG. 6, an example interaction between the first pin 236 and a first slope 420 of the second set of slopes 308 is shown. The first pin 236 begins at an initial position 412 after the first pin 236 has been moved into the first adjustment path 268. The rotational force caused by rotation of the first mode plate 260 along with the geometrical design of first adjustment path 268 causes the first pin 236 to move from an initial position 412 to a final position 416. The first pin 236 moves from the initial position 412 to the final position 416 by traveling up the fourth end 324 of the first slope 420 along the first inner wall 302 and over the third end 320 of the first slope 420. The drop off at the third end 320 prevents the first pin 236 from traveling back over the first slope 420 when the first mode plate 260 is rotated in the opposite direction.

Figure 7:
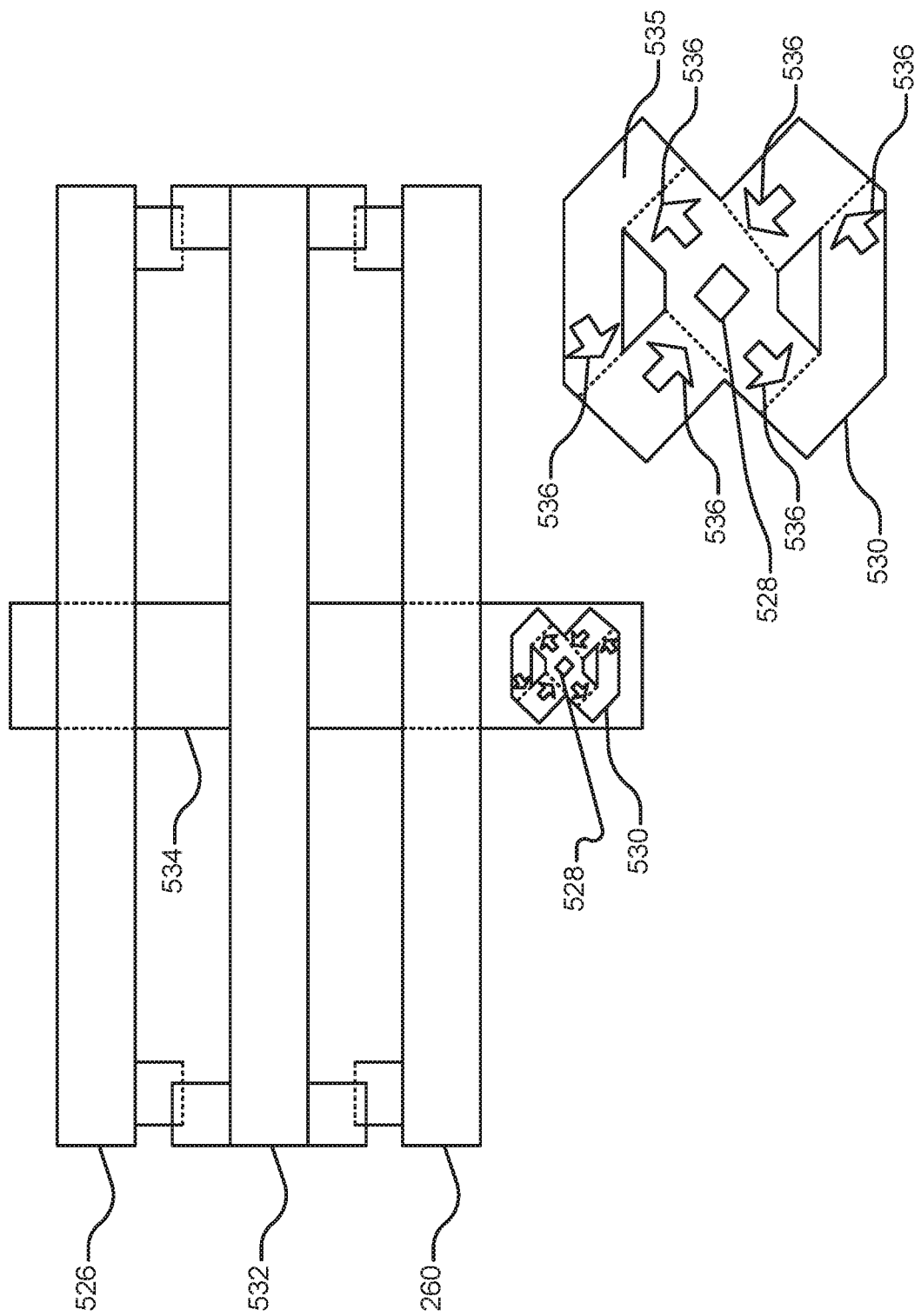
FIG. 7 is a cross-sectional view of a dual mode plate configuration according to the present teachings.

With reference to FIG. 7, a cross-sectional view of a dual mode plate configuration is shown. The dual mode plate configuration includes the first mode plate 260, a second mode plate 526, a center plate 532, and a center shaft 534 including a control gate 530 and a control pin 528. The second mode plate 526 is substantially similar in design to the first mode plate 260 discussed above. With the addition of the second mode plate 526, a second set of four pins may be controlled independently of each other and independently of the first set of pins.

The center plate 532 is positioned between the first mode plate 260 and the second mode plate 526 and is connected to the center shaft 534. Both the first mode plate 260 and the second mode plate 526 face away from the center plate 532. The actuator is connected to the control pin 528 instead of being connected to the first mode plate 260, as discussed above with respect to the first mode plate 260. The control pin 528 is situated inside of the control gate 530 which is fixed to the center shaft 534.

The control gate 530 includes a set of grooves 535 including a fifth set of slopes 536 geometrically similar in design to the second set of slopes 308 and the fourth set of slopes 508. As the actuator rotates, the fifth set of slopes 536 causes the control gate 530 to move with respect to the control pin 528 in a manner that moves the center shaft 534 up or down to contact the first mode plate 260 or the second mode plate 526. Once the control pin 508 is in a specific position and the center plate 532 is in contact with either the first mode plate 260 or the second mode plate 526, the actuator rotates in order to control the respective mode plate that is in contact with the center plate 532. For example, once the center plate 532 is in contact with the second mode plate 526, the second set of pins may be controlled similar to the first set of pins, as discussed with respect to the first mode plate 260.

Figure 8:
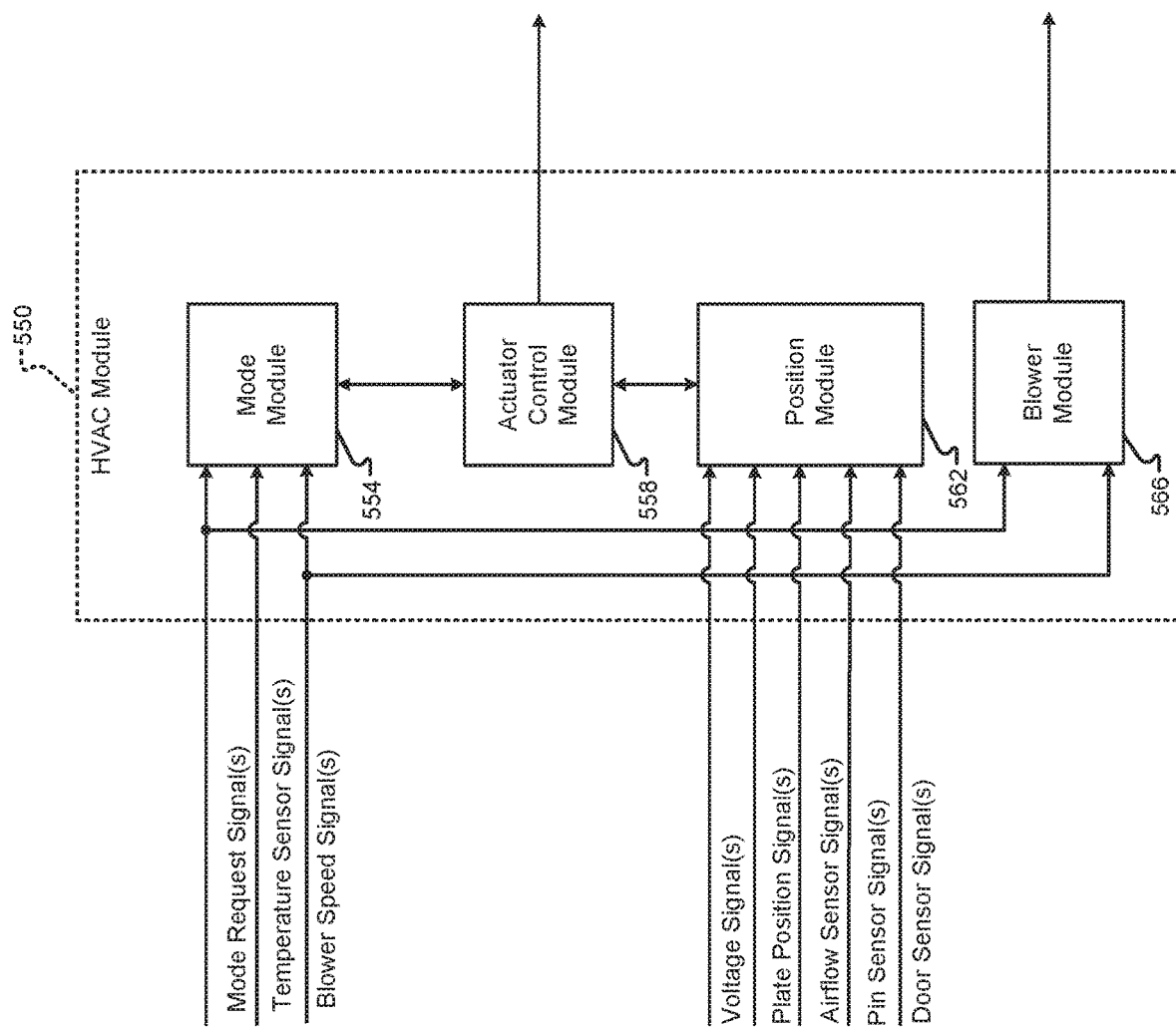
FIG. 8 is a functional block diagram depicting an example implementation of an HVAC module according to the present teachings.

With reference to FIG. 8, a functional block diagram of an example implementation of an HVAC module 550 is shown. The HVAC module 550 includes a mode module 554, an actuator control module 558, a position module 562, and a blower module 566. The mode module 554 selectively instructs the actuator control module 558 to rotate the first mode plate 260 based on a mode request signal. The mode request signal represents a user request for a particular air conditioning mode. For example, the mode request signal may indicate that the user has selected defrost mode by pressing a control button on a dashboard of the vehicle.

The position module 562 stores positional information with respect to the first mode plate 260, the mode doors 135, the position of each pin in the first set of pins, and air flowing through each air duct outlet. The position module 562 may contain one or more lookup tables or arrays. A first lookup table may associate a position for each of the first set of pins, determined by the pin sensor signals, to a position of the respective mode door. A second lookup table may associate a position of the first adjustment path 268 and a position of the second adjustment path 272 with the angular displacement of the first mode plate 260 measured from a reference point.

A third lookup table may associate a position for each of the mode doors 135 based on the mode door sensors with a specific air conditioning mode. A fourth lookup table may associate the airflow through a particular air duct outlet, determined by the airflow sensors, to a position for the respective mode door. A fifth lookup table or array may associate a voltage applied to the actuator to a degree of rotation of the actuator or the first mode plate 260. For example, each address of the array may contain a voltage value and an associated degree of rotation. A sixth lookup table may associate each pin of the first set of pins with a position for each pin for a specific air conditioning mode.

The actuator control module 558 actuates the actuator based on instructions received from the mode module 554 and the position module 562. The blower module 566 controls a speed of the blower based on the blower speed signal. For example, the blower speed signal may represent a speed at which the user has set the blower at through input to a control knob on the dashboard of the vehicle. The blower module 566 may also control the speed of the blower based on the mode request signal.

Figure 9:
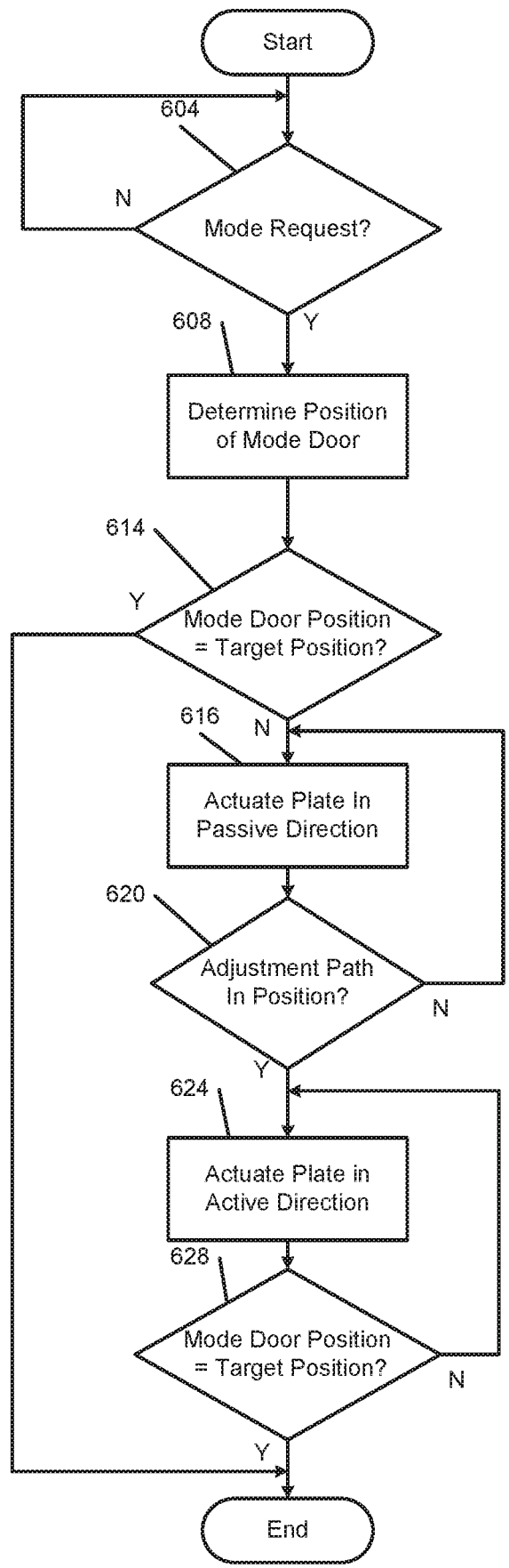
FIGS. 9 and 10 are flowcharts depicting example control operations of a mode plate according to the present teachings.

FIG. 9 depicts an example control operation performed by the HVAC module 550. At 604, control determines whether a mode request has been received. If yes, control continues at 608; otherwise, control may wait for a mode request to be received. At 608, control determines a position of the first mode door 136.

At 614, control determines whether the position for the first mode door 136 is equal to the target position for first mode door 136 specified by the mode request. If so, control may end; otherwise, control may continue at 616. At 616, control may actuate the mode plate in the passive direction. At 620, control determines whether the first adjustment path 268 is in position to adjust the first pin 236 (that is, whether the first adjustment path 268 has moved past the first pin 236 as to allow for the first pin 236 to be engaged along the first adjustment path 268). If so, control may continue at 624; otherwise, control may continue at 616. At 624, control actuates the first mode plate 260 in the active direction which is opposite the passive direction.

At 628, control determines whether the position of the first mode door 136 is equal to the target position. If so, control may end; otherwise, control may continue back at 624. While the example control operation is described in terms of the first pin 236, the first mode door 136, and the first adjustment path 268 similar control operations may be applied to other mode doors 138, 142, and 144, the second adjustment path 272, and other pins 240, 244, and 248. Control may be repeated until each of the mode doors is equal to the target position for each pin specified by the mode request.

Figure 10:
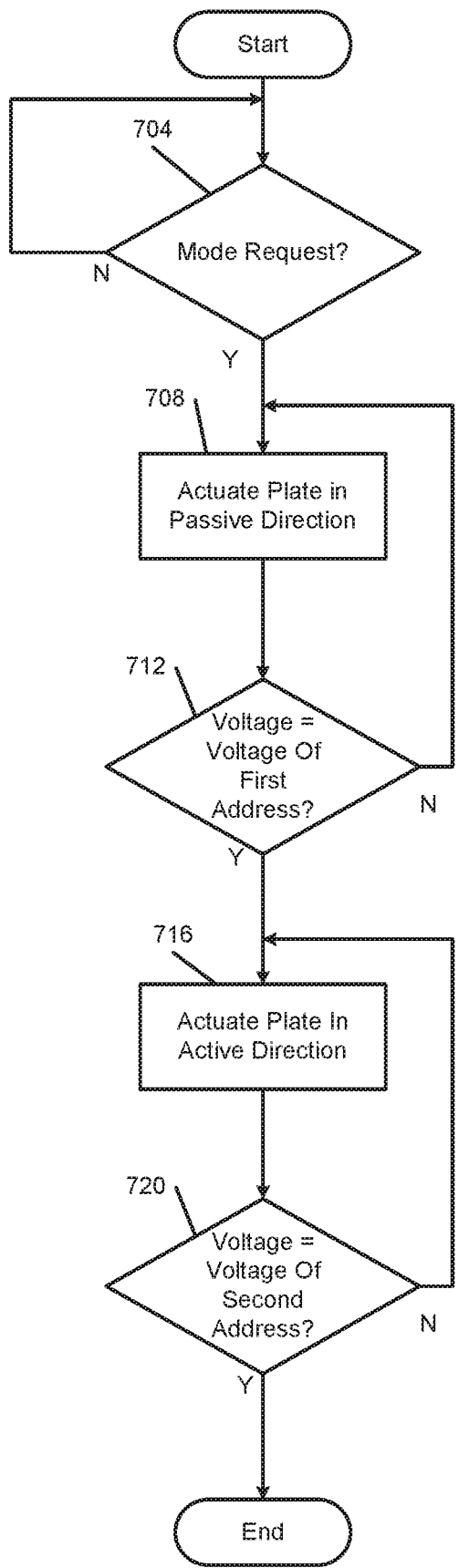

FIG. 10 depicts an example control operation performed by the HVAC module 550. At 704, control determines whether a mode request has been received. If yes, control continues at 708; otherwise, control may wait for a mode request to be received. At 708, control actuates the first mode plate 260 in the passive direction. At 712, control determines whether a voltage being applied to the actuator is equal to a voltage value associated with a first address. If so, control continues at 716; otherwise, control continues back at 708. At 716, control rotates the first mode plate 260 in the active direction. At 720, control determines whether the voltage value being applied to the actuator is equal to a voltage value associated with a second address. If so, control may end; otherwise, control continues back at 716.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may, therefore, be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air conditioning (HVAC) system, the system comprising:
   an HVAC assembly including a blower subassembly, a heater core, and an evaporator;
   a first set of pins;
   a first set of mode doors that control airflow from the HVAC assembly, a position of each mode door of the first set of mode doors being controlled by a corresponding pin of the first set of pins;
   a first mode plate including (i) a set of grooves, (ii) a first adjustment path, and (iii) a second adjustment path, wherein:
      the first adjustment path includes (i) a first inner wall, (ii) a first set of slopes, and (iii) a second set of slopes,
      the second adjustment path includes (i) a second inner wall, (ii) a third set of slopes, and (iii) a fourth set of slopes,
      the first adjustment path and the second adjustment path span from an outermost groove of the set of grooves to an innermost groove of the set of grooves,
      the first adjustment path causes a first pin of the first set of pins to move toward a center of the first mode plate in response to being (i) rotated in an active direction and (ii) selectively positioned, and
      the second adjustment path causes the first pin to move away from the center of the first mode plate in response to being (i) rotated in the active direction and (ii) selectively positioned;
   an actuator that causes the first mode plate to rotate in at least one of a passive direction and the active direction; and
   an HVAC control module that selectively actuates the actuator in response to receiving a mode request.

2. The system of claim 1 wherein:
   the first set of mode doors are connected to the HVAC assembly through a set of hinge portions and rotatable through the set of hinge portions; and
   the actuator is connected to the first mode plate.

3. The system of claim 2 wherein:
   the first adjustment path causes the first pin to move independently of other pins; and
   the second adjustment path causes the first pin to move independently of the other pins.

4. The system of claim 3 wherein:
   each of the second set of slopes includes a first end and a second end;
   each of the third set of slopes includes a third end and a fourth end;
   the first end (i) is positioned closer to the center of the first mode plate than the second end, (ii) has a higher elevation than the second end, and (iii) is opposite the second end; and
   the third end (i) is positioned further from the center of the first mode plate than the fourth end, (ii) has a higher elevation than the fourth end, and (iii) is opposite the fourth end.

5. The system of claim 4 wherein the first adjustment path and the second adjustment path are integrally formed with the first mode plate.

6. The system of claim 5 wherein:
   the passive direction and the active direction are opposite directions; and
   in response to being rotated in the passive direction, the first adjustment path and the second adjustment path do not move the first pin toward the center of the first mode plate or away from the center of the first mode plate.

7. The system of claim 6 wherein the set of grooves are U-shaped.

8. The system of claim 7 wherein:
   a height of the first end is less than a height of the first inner wall; and
   a height of the third end is less than a height of the second inner wall.

9. The system of claim 8 wherein the mode request is a request to change a temperature setting of at least one zone of a vehicle.

10. The system of claim 9 wherein the first pin is moved along at least one of the first adjustment path and the second adjustment path until the first pin reaches a target position.

11. The system of claim 9 wherein in response to the first pin reaching a target position, the HVAC control module instructs the actuator to at least one of a change of direction of rotation of the first mode plate and stop rotating.

12. The system of claim 2 further comprising:
a second set of mode doors;
a second set of pins;
a second mode plate including (i) a second set of grooves, (ii) a third adjustment path, and (iii) a fourth adjustment path, wherein:
the third adjustment path includes (i) a third inner wall, (ii) a fifth set of slopes, and (iii) a sixth set of slopes,
the fourth adjustment path includes (i) a fourth inner wall, (ii) a seventh set of slopes, and (iii) an eighth set of slopes,
the third adjustment path and the fourth adjustment path span from an outermost groove of the second set of grooves to an innermost groove of the second set of grooves,
the third adjustment path causes a second pin of the second set of pins to move toward a center of the second mode plate in response to being (i) rotated in the active direction and (ii) selectively positioned, and
the fourth adjustment path causes the second pin to move away from the center of the second mode plate in response to being (i) rotated in the active direction and (ii) selectively positioned;
a center plate that is positioned between the first mode plate and the second mode plate; and
a center shaft that is connected to the center plate, wherein:
the center shaft includes a control gate, a control pin, and a ninth set of slopes,
the actuator is further configured to cause the second mode plate to rotate in at least one of the passive direction and the active direction,
the actuator is connected to the control pin, and
a position of each mode door of the second set of mode doors being controlled by a corresponding pin of the second set of pins.

13. The system of claim 12 further comprising:
each slope of the fifth set of slopes includes a ninth end and tenth end; and
the ninth end has a higher elevation than the tenth end and is opposite the tenth end.

14. A mode plate for a heating, ventilation and air conditioning (HVAC) system, the HVAC system including an HVAC control module, a blower subassembly, a heater core, an evaporator, an actuator, a set of pins, and a set of mode doors that controls airflow from the HVAC system, the mode plate comprising:
a set of grooves;
a first adjustment path that selectively causes a pin in the set of pins to move toward a center of the mode plate; and
a second adjustment path that selectively causes the pin to move away from the center of the mode plate, wherein:
the first adjustment path includes (i) a first inner wall, (ii) a first set of slopes, and (iii) a second set of slopes,
the second adjustment path includes (i) a second inner wall, (ii) a third set of slopes, and (iii) a fourth set of slopes,
the first adjustment path and the second adjustment path span from an outermost groove of the set of grooves to an innermost groove of the set of grooves,
the first adjustment path causes the pin to move toward a center of the mode plate in response to being (i) rotated in an active direction and (ii) selectively positioned,
the second adjustment path causes the pin to move away from the center of the mode plate in response to being (i) rotated in the active direction and (ii) selectively positioned,
the actuator causes the mode plate to rotate in at least one of a passive direction and the active direction,
the HVAC control module selectively actuates the actuator in response to receiving a mode request, and
a position of each mode door of the set of mode doors being controlled by a corresponding pin of the set of pins.

15. A method for controlling mode doors of an HVAC system including an HVAC control module, a blower subassembly, a heater core, an evaporator, an actuator, a set of pins, a mode plate including a set of grooves, and a set of mode doors that controls airflow from the HVAC system, the method comprising:
in response to receiving a mode request: (i) determining a position of at least one pin in the set of pins and (ii) determining whether the at least one pin is set to a target position specified by the mode request; and
in response to determining that the at least one pin is not set to the target position: (i) rotating the mode plate in a passive direction until at least one of a first adjustment path and a second adjustment path is in position to adjust the at least one pin and (ii) in response to at least one of the first adjustment path and the second adjustment path being in position to adjust the at least one pin, rotating the mode plate in an active direction until the at least one pin reaches the target position, wherein:
a position of each mode door of the set of mode doors being controlled by a corresponding pin of the set of pins,
the first adjustment path includes (i) a first inner wall, (ii) a first set of slopes, and (iii) a second set of slopes,
the second adjustment path includes (i) a second inner wall, (ii) a third set of slopes, and (iii) a fourth set of slopes, and
the first adjustment path and the second adjustment span from an outermost groove of the set of grooves to an innermost groove of the set of grooves.

16. The method of claim 15 wherein:
the first adjustment path causes the at least one pin to move independently of other pins in the set of pins; and
the second adjustment path causes the pin to move independently of the other pins.

17. The method of claim 16 wherein the passive direction and the active direction are opposite directions.

18. The method of claim 17 wherein rotating the pin in the active direction moves the at least one pin towards at least one of a center of the mode plate or away from the center of the mode plate.

19. The method of claim 16 wherein rotating the mode plate in the passive direction does not change the position of the at least one pin with respect to a center of the mode plate.

20. The method of claim 15 wherein the mode request is a request to change a temperature setting of at least one zone of a vehicle.

* * * * *